(12) United States Patent
Conrad et al.

(10) Patent No.: US 7,945,836 B2
(45) Date of Patent: May 17, 2011

(54) METHOD AND APPARATUS FOR REDUCING SIGNALING OVERHEAD IN A COMMUNICATION SYSTEM USING HYBRID AUTOMATIC REPEAT REQUEST

(75) Inventors: Alan P. Conrad, Geneva, IL (US); Kevin G. Doberstein, Elmhurst, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1000 days.

(21) Appl. No.: 11/765,634

(22) Filed: Jun. 20, 2007

(65) Prior Publication Data

US 2008/0320357 A1 Dec. 25, 2008

(51) Int. Cl.
*H04L 1/18* (2006.01)
(52) U.S. Cl. ........................ 714/749; 714/779
(58) Field of Classification Search .................. 714/749, 714/779
See application file for complete search history.

(56) References Cited

U.S. PATENT DOCUMENTS

| 5,271,012 | A | * | 12/1993 | Blaum et al. ....................... 714/6 |
| 6,023,783 | A | * | 2/2000 | Divsalar et al. ................ 714/792 |
| 2002/0093937 | A1 | | 7/2002 | Kim |
| 2003/0210669 | A1 | | 11/2003 | Vayanos |
| 2005/0048920 | A1 | | 3/2005 | Liu |
| 2005/0213536 | A1 | | 9/2005 | Virtanen |
| 2007/0011555 | A1 | * | 1/2007 | Kim et al. ...................... 714/749 |
| 2007/0155337 | A1 | * | 7/2007 | Park et al. ........................ 455/69 |
| 2008/0317152 | A1 | * | 12/2008 | Sun et al. ........................ 375/261 |
| 2010/0220668 | A1 | * | 9/2010 | Yamada et al. ................ 370/329 |

FOREIGN PATENT DOCUMENTS

WO WO2005060145 A1 6/2005

* cited by examiner

*Primary Examiner* — M. Mujtaba K Chaudry
(74) *Attorney, Agent, or Firm* — Terri S. Hughes

(57) ABSTRACT

A transmitting unit combines a slot identifier (SI) and a block identifier (BI) in each header that is transmitted with the data to allow a receiving unit to associate previously received data blocks with retransmissions, or retries, of the same respective data blocks in order to perform bit error detection in accordance with a hybrid or selective ARQ protocol. The receiving unit uses the SI and BI contained in the MHBKs to determine a correspondence between a retried data and a previously transmitted data block.

20 Claims, 7 Drawing Sheets

FIG. 5A

| MHBK | MDBK1 | | MDBK2 | | MDBK3 | | MDBK4 | |
|---|---|---|---|---|---|---|---|---|
| | 64 QAM, 2/3 RATE | 64 QAM, 2/3 RATE | 64 QAM, 2/3 RATE | 64 QAM, 2/3 RATE | 64 QAM, 2/3 RATE | 64 QAM, 2/3 RATE | 64 QAM, 2/3 RATE | 64 QAM, 2/3 RATE |

↙ 20

BI BITS

| BI-1 | BI-2 | BI-3 | BI-4 | BI-5 | BI-6 |
|---|---|---|---|---|---|
| 0 | 0 | 0 | 0 | 0 | 0 |

FIG. 5B

| MHBK | MDBK2 |
|---|---|
| | 16 QAM, 1/2 RATE |

↙ 30 (MDBK3)

BI BITS

| BI-1 | BI-2 | BI-3 | BI-4 | BI-5 | BI-6 |
|---|---|---|---|---|---|
| 0 | 1 | 1 | 0 | 0 | 0 |

FIG. 5C

| MHBK | NEW MDBK4 | | NEW MDBK1 | | NEW MDBK2 | |
|---|---|---|---|---|---|---|
| | 16 QAM, 1/2 RATE | | 64 QAM, 2/3 RATE | 64 QAM, 2/3 RATE | 64 QAM, 2/3 RATE | 64 QAM, 2/3 RATE |

↙ 40

BI BITS

| BI-1 | BI-2 | BI-3 | BI-4 | BI-5 | BI-6 |
|---|---|---|---|---|---|
| 0 | 0 | 0 | 1 | 0 | 0 |

FIG. 5D

| MHBK | MDBK4 |
|---|---|
| | 4 QAM, 1/2 RATE |

↙ 50

BI BITS

| BI-1 | BI-2 | BI-3 | BI-4 | BI-5 | BI-6 |
|---|---|---|---|---|---|
| 0 | 0 | 0 | 1 | 0 | 0 |

METHOD AND APPARATUS FOR REDUCING SIGNALING OVERHEAD IN A COMMUNICATION SYSTEM USING HYBRID AUTOMATIC REPEAT REQUEST

TECHNICAL FIELD OF THE INVENTION

The invention relates to communications system. More particularly, the invention relates to reducing signaling overhead in a communication system using hybrid automatic repeat request (HARQ).

BACKGROUND OF THE INVENTION

When bits of data are transmitted over a system, the bits are sometimes corrupted. Consequently, a receiving unit that receives the data is unable to decode the corrupted data bits, or improperly decodes one or more of the corrupted data bits. Various error detection techniques are employed to detect bit errors. One such technique is known as the cyclic redundancy check (CRC) technique. The CRC technique produces a binary checksum using bits of data to be transmitted and appends the checksum to the data bits and transmits the bits of data and the bits making up the checksum together over the system. The receiving unit receives the checksum and the data and uses the checksum to determine whether the data bits contain any bit errors.

In systems that use what is known as the automatic repeat request (ARQ) protocol to correct bit errors, blocks of data are discarded if the results of performing the CRC technique indicate that one or more bits of a block are incorrect. Block failures are signaled to the transmitting unit, which, in turn, retransmits the failed data block.

In systems that use what is known as a HARQ protocol, blocks that fail CRC are not discarded. Rather, information (e.g., hard bits, soft information (e.g., log likelihood ratios), baseband samples, or the like) from the failed block transmissions are stored and subsequently combined with information from previous transmissions of the same block in order to improve error performance. However, this requires that the receiving unit have the knowledge to determine which information from which data block retransmissions can be combined. Normally, this knowledge is signaled at the logical link control (LLC) layer, which is coded along with the payload information. This means that the receiving unit cannot determine which data blocks to combine unless it can decode the data blocks.

An alternative to signaling this knowledge at the LLC layer is to signal block ordering information at the media access control (MAC) layer. To signal this information directly at the MAC layer requires a significant amount of signaling overhead. For example, in the existing Telecommunications Industry Association (TIA)-902 standard, a 12-bit segment/sequence number is used to uniquely identify each data block at the LLC layer, and a plurality of data blocks are transmitted in each slot. Each slot can have up to six blocks. Therefore, to signal this block ordering information at the MAC layer to support HARQ requires that seventy-two additional bits are added to a MAC header block (MHBK) which equates to one twelve-bit sequence number for each of the possible six blocks in the slot. This translates into a loss in raw throughput of 7.2 kilobits per second (kb/s), which does not even take into account that duplicate segment/sequence numbers can exist on the outbound link differentiated by the receiving unit address, which would require an even larger numbering field for the MHBK, thereby further limiting throughput.

BRIEF DESCRIPTION OF THE FIGURES

Various embodiments of the disclosure are now described, by way of example only, with reference to the accompanying figures, in which:

FIGS. 5A-5D illustrate different examples of MAC data blocks (MDBKs) being transmitted by a transmitting unit along with associated values for BI bits in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It is further appreciated that certain actions and/or steps may be described or depicted in a particular order of occurrence while those skilled in the art will understand that such specificity with respect to sequence is not actually required. It is also understood that the terms and expressions with respect to their corresponding respective areas of inquiry and study except where specific meaning have otherwise been set forth herein.

DETAILED DESCRIPTION OF THE INVENTION

A need exists for a way to implement a HARQ protocol that reduces the amount of signaling overhead required to associate a previously transmitted data block with a retransmission of the same data block. In accordance with the invention, a transmitting unit combines a slot identifier (SI) and a block identifier (BI) in each header that is transmitted with the data to allow a receiving unit to associate previously received data blocks with retransmissions, or retries, of the same respective data blocks in order to perform bit error correction in accordance with HARQ protocol. The receiving unit uses the SI and BI contained in the MHBKs to determine a correspondence between a retried data and a previously transmitted data block. It should be noted that the invention is not limited with respect to the locations at which the SI and BI bits are contained in the MHBK, or that the SI and BI bits are contained in the MHBK at all. The SI and BI bits could be transmitted in a header that is separate from the MHBK, such as in a HARQ header, for example.

The terms "retry" and "retransmission", as those terms are used herein, are intended to denote a transmission of a data block subsequent to the first, or initial, transmission of the same data block. As described below, using the combined SI and BI of the invention reduces the amount of overhead that is consumed for this purpose compared to that which would be consumed to signal block ordering information at the MAC layer using other signaling techniques, such as, for example, using the aforementioned 12-bit sequence numbers to identify data blocks.

Figure 1:
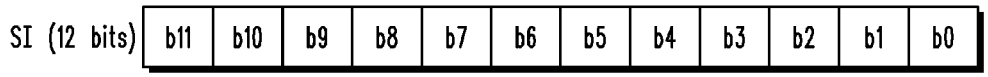
FIG. 1 illustrates a HARQ signaling protocol for a slot identifier (SI) and a block identifier (BI) in accordance with an embodiment.
Figure 1:
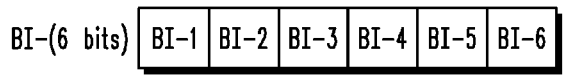

FIG. 1 illustrates the HARQ signaling frame structure for the SI and BI in accordance with an exemplary embodiment of the invention. In accordance with this embodiment, the SI is a 12-bit field and the BI is a 6-bit field. It should be noted that the SI and BI are not limited to a 12-bit field and the 6-bit field, respectively, but can vary in size in other embodiments. The SI is used to identify the slot which carries the original MDBK transmission. The BI is a field of bits that are either set or cleared to indicate a correspondence between the location of a retried block in a currently transmitted slot and the location of the same block in a previously transmitted slot. A maximum of six MDBKs are capable of being transmitted in a slot, and are identified as BI-1 through BI-6, although it is not required that six MDBKs are transmitted in each slot, as will become apparent from the description below of FIGS. 5A-5D.

Figure 2:
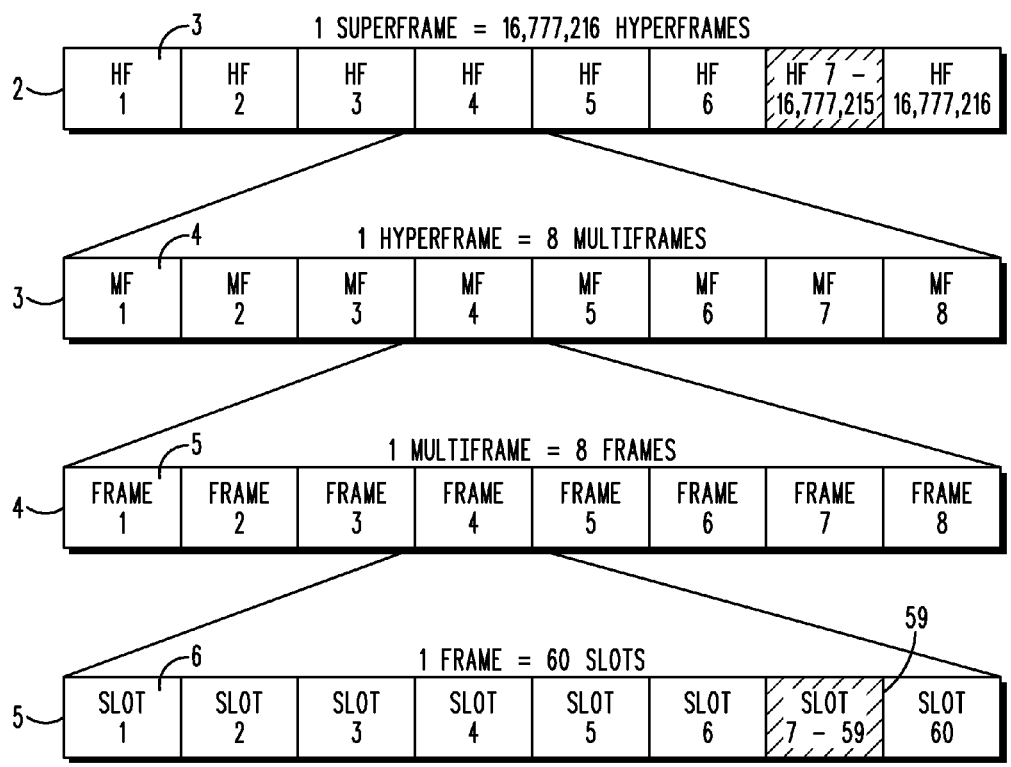
FIG. 2 illustrates a time division multiple access (TDMA) frame structure in accordance with the TIA-902 standard.

In accordance with an exemplary embodiment of the invention, a TDMA frame structure as defined in the TIA-902 standard is used to create the SI. FIG. 2 illustrates the TIA-902 TDMA frame structure. In this exemplary embodiment, the structure is defined by a super-frame (SF) 2 having 16,777,216 hyper-frames (HFs) 3; each HF 3 is made up of 8 multi-frames (MFs) 4; each MF 4 is made up of 8 frames 5; each frame 5 is made up of 60 slots 6; each slot 6 corresponds to a time duration of 10 milliseconds (ms), and up to six data blocks can be transmitted in each slot.

In accordance with this embodiment, the SI is computed using modulo-2 logical operations in accordance with the following equation:

$$SLI=(S_l+k(F_r+8M_f+64H_f))\% \ 2^n, \quad (Eq. \ 1)$$

where $S_l$ is the slot number, k is the number of slots per frame, $F_r$ is the frame number, $M_f$ is the multi-frame number, $H_f$ is the hyper-frame number, n is the number of bits in the SI field and "%" is the modulus operator. Because the TIA-902 standard allows for a variable number of slots per frame (from 2 to 63), the variable k is used to identify the number of slots per frame. Per this embodiment, the values 8 and 64 are derived from the number of frames per MF and frames per HF, respectively. Using the TDMA frame structure to compute the SI provides an easy way to synchronize the SI between the transmitting unit and the receiving unit without requiring the use of a large amount of signaling overhead.

Upon the initial transmission of a MDBK, the transmitting unit uses the hyper-frame, multi-frame, frame, and slot number of the transmission along with the number of slots per frame, k, to compute the SI in accordance with Equation 1. The transmitting unit stores the SI value along with the block number (1 to 6) corresponding to the location of the MDBK within the slot for each initial transmission. The SI and BI bits are cleared in the MHBK when all MDBKs in the slot are initial transmissions. Upon transmission of a retry, the transmitting unit places the SI value that was stored from the initial transmission into the MHBK of the slot containing the retries. The transmitting unit also marks the block number of each retried block as it existed in the initial transmission slot, using the BI bits. An example of the manner in which the SI and BI are used will be described with reference to FIGS. 5A-5D.

Figure 3:
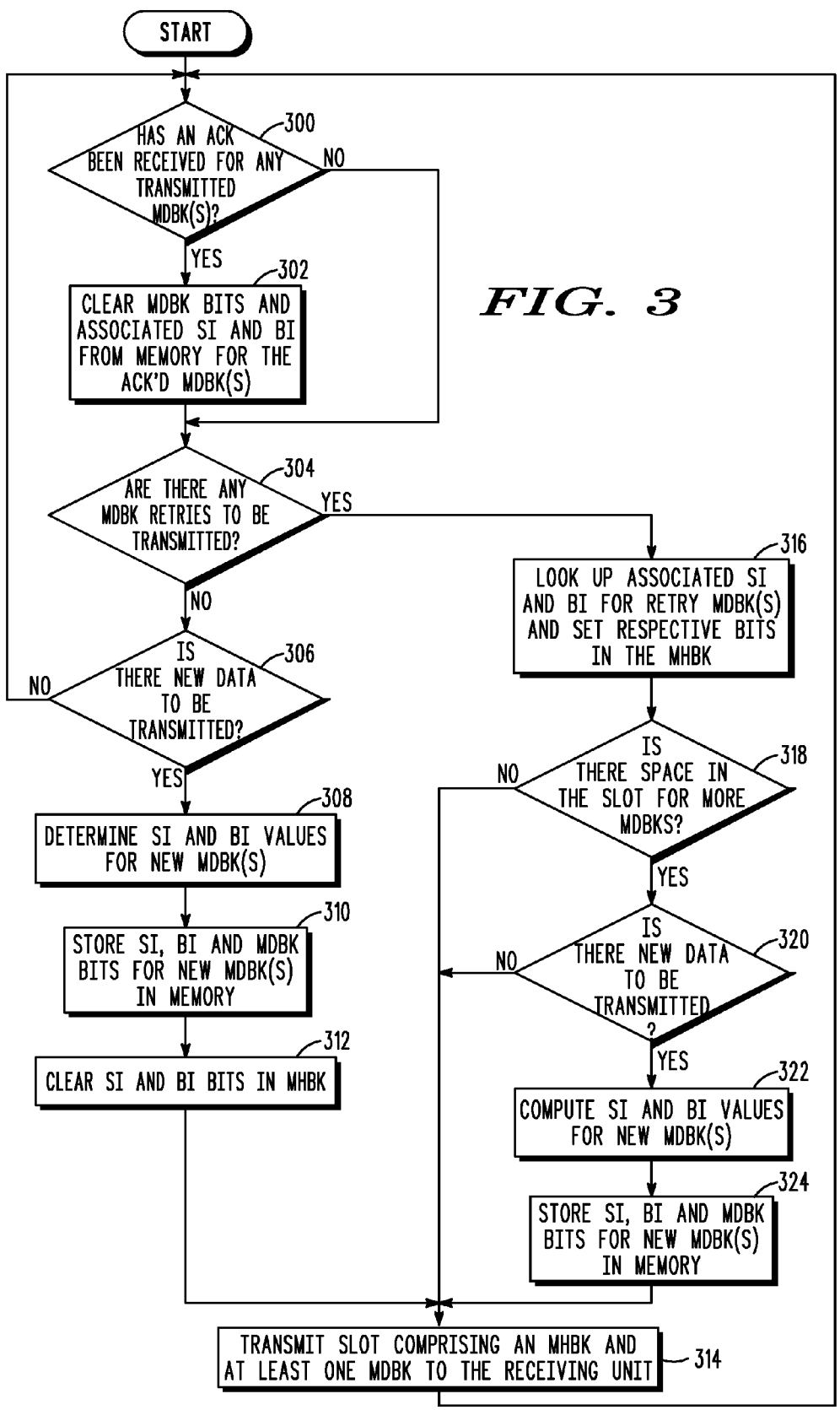
FIG. 3 illustrates a flowchart that represents the method of the invention in accordance with exemplary embodiments performed by the transmitting unit.

FIG. 3 illustrates a flowchart that represents the method of the disclosure in accordance with an exemplary embodiment performed by the transmitting unit. The transmitting unit first determines if any acknowledgements have been received for previously transmitted MDBKs, as indicated by 300. If yes, any associated SI, BI and MDBK bits are cleared from memory for all MDBKs that have been acknowledged in 302; otherwise, the flow proceeds directly to 304. MDBK retries must be packed into the slot first. The transmitting unit checks for MDBKs to be retried in 304. When no retry MDBKs exist, a check for new data transmission occurs as indicated in 306. If there is no data to be transmitted, the flow returns to 300. When new data does exist for transmission, the transmitting unit determines SI and BI values in 308 and stores the SI and the associated BI values in memory along with the MDBK bits in 310. The transmitting unit clears the SI and BI bits in the MHBK, as indicated by block 312. The transmitting unit then transmits the slot comprising at least one MDBK and the associated MHBK to the receiving unit, as indicated by block 314. The flow returns to 300 and the transmitting unit waits for an ACK reply from the receiving unit for all of the MDBKs that were initially transmitted.

Returning to decision point 304, if there were retries to be transmitted, the transmitting unit retrieves, or performs a "look up" function, of the associated SI and BI bits for the respective MDBKs and sets the respective SI and BI bits in the MHBK for the appropriate MDBK retries upon packing the retry MDBK(s) in the slot in 316. Retries can be triggered by the reception of a negative acknowledgement as well as the expiration of an acknowledgement timer. If there is no space for additional MDBKs at 318, processing continues at block 314 where the slot comprising an MHBK and at least one MDBK is transmitted to the receiving unit. If space exists in the slot, as determined by 320, new MDBK data can be placed after the retried MDBKs within the slot. The SI and BI values of the new MDBK data are computed in 322 and stored in memory along with the MDBK bits in 324. The retried and new MDBKs are transmitted to the receiving unit in 314. The flow returns to 300 and the transmitting unit waits for an ACK reply from the receiving unit for all of the MDBKs that were transmitted.

Figure 4:
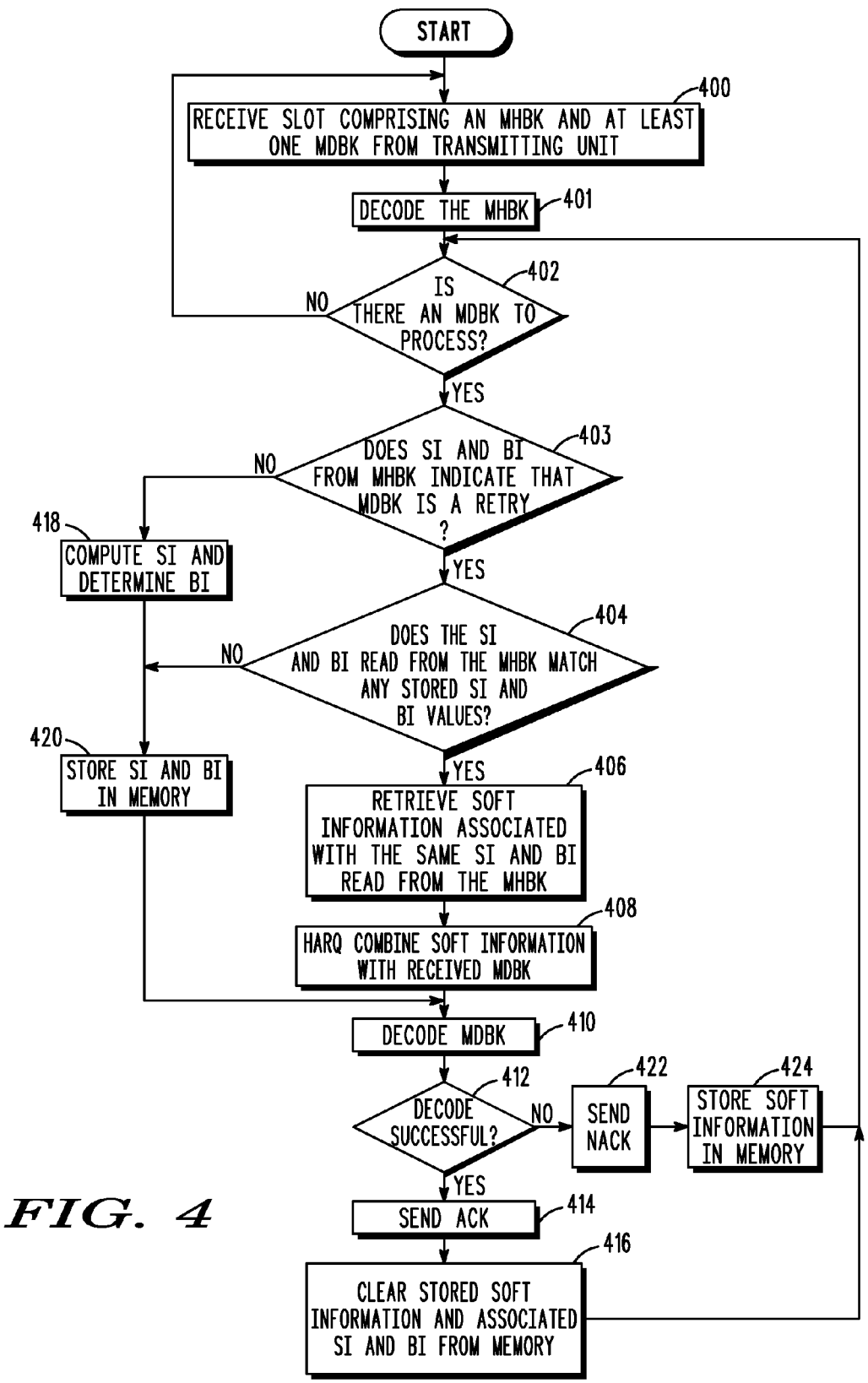
FIG. 4 illustrates a flowchart that represents the method of the invention in accordance with an exemplary embodiment performed by the receiving unit.

FIG. 4 illustrates a flowchart that represents the method of the disclosure in accordance with an exemplary embodiment performed by the receiving unit. The receiving unit receives a slot comprising an MHBK and at least one MDBK transmitted by a transmitting unit, as indicated by block 400. The receiving unit decodes the MHBK in 401 and determines whether there is an MDBK to process in 402. If there are no MDBKs to process for the slot, the flow returns to 400 and waits to receive the next slot from the transmitting unit. If there is an MDBK to process in 402, the receiving unit determines if any of the received MDBKs are retries through examination of the SI and BI bit values contained in the associated MHBK in 403. If the SI and BI bit values are non-zero in the MHBK, the slot contains at least some retried MDBKs. Cleared SI and BI bits indicate that all MDBKs in the slot are new. When retries are received, the receiving unit uses the SI value contained in the MHBK and the associated BI values to match up one or more of the retried MDBKs currently being received with one or more MDBKs that were previously received, as indicated by block 406. The receiving unit HARQ combines the stored soft information associated with received SI and BI in 408 and decodes the combined soft information, as indicated by block 410. The receiving unit sends ACK replies to the transmitting unit for MDBKS that were successfully received, as indicated by block 414. The receiving unit sends NACK replies to the transmitting unit for MDBKs that were not successfully received, as indicated by block 422. The soft information from the HARQ combined MDBK is stored with the associated SI and BI in 424. The process then returns to block 400.

Returning to 403, if the received MDBK is a new MDBK, the receiving unit computes the SI value and determines the BI bit value of the MDBK in 418 and stores them into memory in 420. The newly received MDBK is decoded in 410. If the decoding of the newly received MDBK is successful, an acknowledgement is returned to the transmitting unit in 414, and the SI and BI bit values that had previously been stored in 420 are cleared from memory as indicated in 416. If the newly received MDBK fails to decode in 412, the receiving unit sends a negative acknowledgment to the transmitting unit in 422, and the soft information for the MDBK is stored in memory with its associated SI and BI bit values in 424.

FIGS. 5A-5D illustrate different examples of MDBKs being transmitted by a transmitting unit along with MHBKs that include the SI and BI bits. For ease of illustration and discussion, the slots are shown in FIGS. 5A-5D as having a maximum of four MDBKs, although each slot in accordance with the TIA-902 standard being used for this exemplary embodiment is capable of transmitting six MDBKs. The initial transmission dictates which block numbers are associated with which blocks by their position within the slot. The block number is signaled with the retry by setting the appropriate BI bit. The ordering of the MDBKs within the retry slot is preserved and the order in which the set and cleared BI bits occur in the MHBK follows the order of the MDBKs within the slot.

With reference to FIG. 5A, four MDBKs 1-4 are being transmitted in the slot 20 in an initial transmission. Therefore, all of the BI bits (BI-1-BI-6) are cleared in the MHBK of slot 20 to indicate that this is the initial transmission of these MDBKs. The SI value is computed using Equation 1 and stored in memory in the transmitting unit along with the block numbers of the blocks being transmitted in slot 20. The SI bits that are transmitted in the MHBK during the initial transmission are also cleared. Each of the MDBKs is transmitted in the slot 20 using 64 quadrature amplitude modulation (64 QAM), ⅔ rate coding.

With reference to FIG. 5B, it is assumed that MDBKs 1 and 4 were successfully received by the receiving unit and that MDBKs 2 and 3 were not successfully received and need to be retransmitted, or retried. As stated above, block ordering is preserved in order to enable the receiving unit to easily determine a correspondence or association between a block that is currently being retransmitted, or retried, and the same previously transmitted block. For this reason, the slot 30 shown in FIG. 5B transmits MDBKs 2 and 3 in the same order in which they were initially transmitted to preserve the ordering, i.e., MDBK 2 is transmitted immediately preceding MDBK 3. The BI bits corresponding to these blocks are set and all of the other BI bits are cleared in the MHBK of slot 30. The SI bits in the MHBK of slot 30 correspond to the SI value that was calculated for the initial transmission and stored in memory. Because the slot 30 is only transmitting two MDBKs in this example, each of the MDBKs 2 and 3 is transmitted using 16 QAM, ½ rate coding to more efficiently utilize the entire slot. Also, retries are often transmitted at different rates than the rates used for the initial transmissions.

The receiving unit knows what type of coding is being used and determines that only two MDBKs are being transmitted in slot 30. The receiving unit also knows that the two MDBKs in the slot 30 are in the same order that they were in during the initial transmission of slot 20. Because BI bits BI-2 and BI-3 are set, the receiving unit determines that the first MDBK in slot 30 corresponds to a retry of MDBK 2 and that the second MDBK in slot 30 corresponds to a retry of MDBK 3. Because the SI value contained in the MHBK of slot 30 is the same as the SI value that was calculated and stored for the initial transmission in slot 20, the receiving unit determines that MDBKs 2 and 3 being transmitted in slot 30 correspond to MDBKs 2 and 3 that were initially transmitted in slot 20.

With reference to FIG. 5C, it is assumed for exemplary purposes that MDBKs 1, 2 and 3 of the initial transmission depicted in FIG. 5A were successfully received and that only MDBK 4 needs to be retried in slot 40. Only BI bit BI-4 is set in the MHBK of slot 40 to indicate that MDBK 4 is being retried in slot 40. The SI bits contained in the MHBK of slot 40 correspond to the SI value that was calculated for the initial transmission in slot 20 and stored in memory. The initial transmissions of two new blocks, New MDBK 1 and New MBDK 2, are also contained in slot 40. Therefore, a new SI value is computed for these initial transmissions and stored in memory in the transmitting unit along with the block numbers of the new blocks.

Another way in which ordering is preserved is that retried blocks always reside before initial transmissions of new blocks in the slot. The receiving unit determines from set BI bit BI-4 in the MHBK of slot 40 that MDBK 4 is being retried, and that the first MDBK in slot 40 corresponds to MDBK 4. Because BI bit BI-4 is the only one of the BI bits that is set, the receiving unit determines that New MDBK 1 and New MDBK 2 are initial transmissions. Because the SI value contained in the MHBK of slot 40 is the same as the SI value that was calculated and stored for the initial transmission of slot 20, the receiving unit determines that MDBK 4 retried in slot 40 correspond to MDBK 4 initially transmitted in slot 20. The retry of MDBK 4 is transmitted using 16 QAM, ½ rate coding. The initial transmissions of New MDBKs 1 and 2 in this embodiment are transmitted using 64 QAM, ⅔ rate coding.

With reference to FIG. 5D, because only BI bit BI-4 is set in the MHBK header, the receiving unit determines that MDBK 4 is the only block being retried in slot 50. Again, the SI bits contained in the MHBK of slot 50 correspond to the SI value that was calculated for the initial transmission and stored in memory. Because there is no other MDBK being transmitted in slot 50, the receiving unit determines that the MDBK contained in slot 50 corresponds to MDBK 4. Because the SI value contained in the MHBK of slot 50 is the same as the SI value contained in the MHBK of slot 20, the receiving unit determines that MDBK 4 retried in slot 50 corresponds to MDBK 4 initially transmitted in slot 20.

Figure 6A:
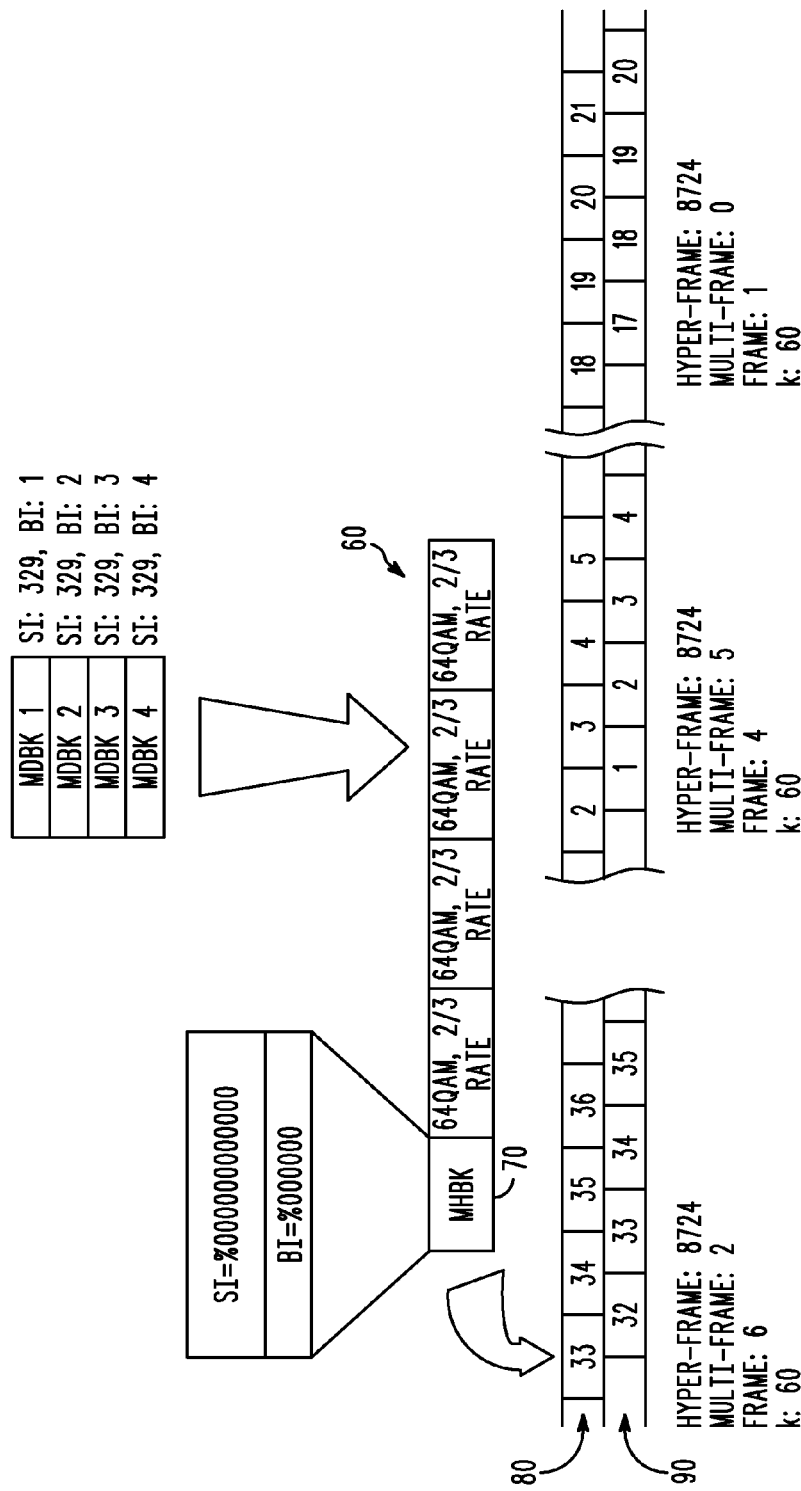
FIG. 6 illustrates a dataflow diagram that demonstrates an example of the manner in which MDBKs are transmitted and retried in accordance with the exemplary embodiment described above with reference to FIGS. 5A-5D.
Figure 6B:
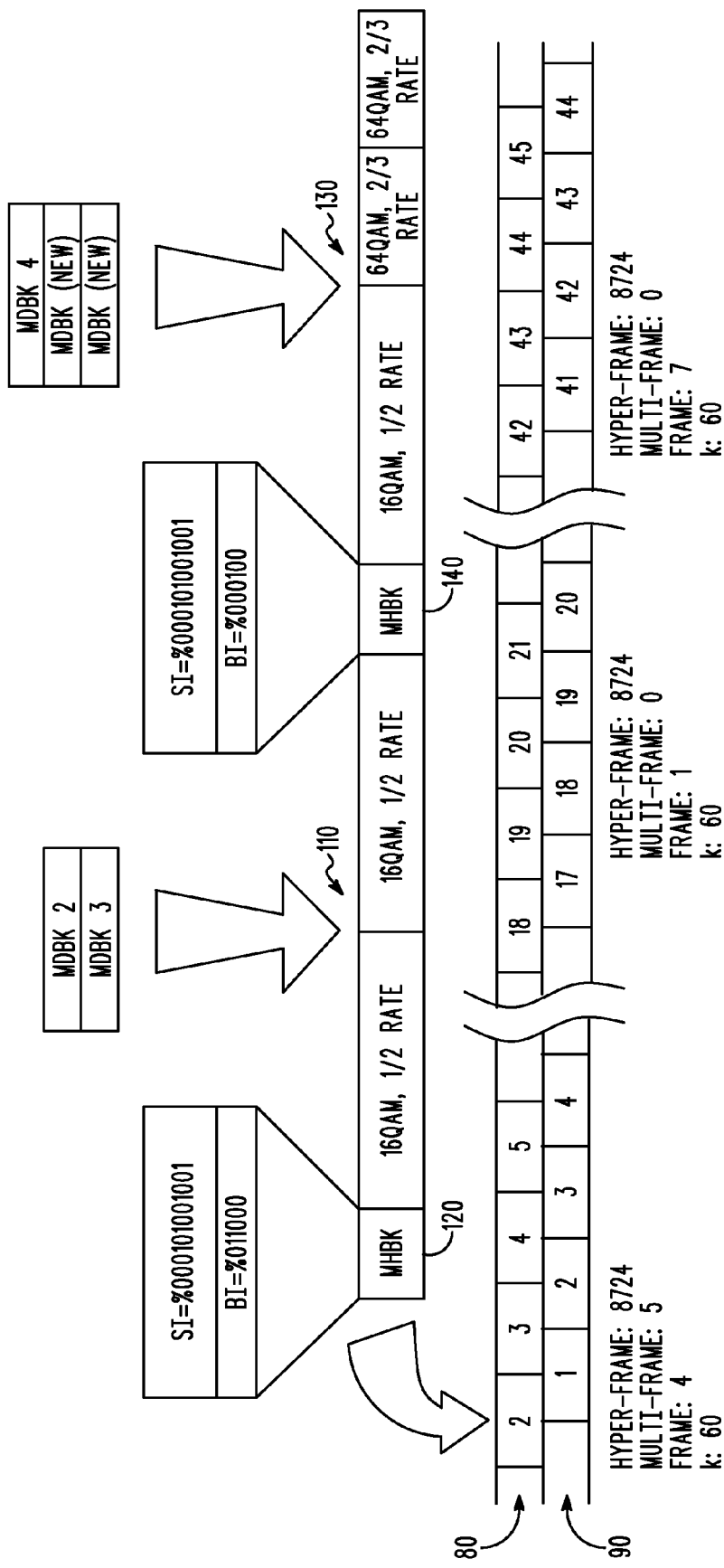

FIG. 6 illustrates a dataflow diagram that demonstrates an example of the manner in which MDBKs are transmitted and retried in accordance with the exemplary embodiment described above with reference to FIGS. 5A-5D. For this example, four MDBKs, namely MDBKs 1-4, of data are to be sent from a transmitting unit to a receiving unit in slot 33 of a 60-slot frame (k=60) of HF number 8724, MF number 2, frame number 6. Stream 80 represents the downlink data, which corresponds to the direction of desired data message flow from a transmitting unit to a receiving unit. Stream 90 represents the uplink data, which includes ARQ protocol responses sent by the receiving unit to the transmitting unit. Using Equation 1, the transmitting unit calculates the SI value to be 329. The corresponding binary SI value is stored in memory in the transmitting unit along with the associated block number for each block. The SI and BI bits are all cleared during the initial transmission, as indicated in the MHBK 70. The LLC data 60 is then transmitted with the associated MHBK 70 in slot 33.

Upon reception of slot 33, the receiving unit determines that all blocks in the slot contain newly transmitted data (i.e., there are no retries) since the SI and BI fields are cleared in the MHBK 70. The receiving unit computes the SI value to be 329 using Equation 1. An attempt to decode each block is made. The receiving unit stores the LLRs of any block which fails to decode correctly, along with the associated BI value and the computed SI value. In the example of FIG. 6, MDBK 1 decodes correctly but MDBKs 2, 3 and 4 do not. The receiving unit will store the LLRs, the computed SI value of 329, and the associated BI values for MDBKs 2, 3, and 4. It then transmits an acknowledgement (ACK) for MDBK 1 and negative acknowledgement (NACK) for MDBKs 2, 3, and 4 to the transmitting unit.

Sometime later, the transmitting unit receives the acknowledgement indicating that MDBK 1 was received correctly and negative acknowledgements indicating that MDBKs 2-4 need to be retried. In the meantime, new LLC data is ready to be sent by the transmitting unit which requires confirmed delivery in this embodiment. As stated above, the blocks that are to be retried are sent in the same order as in the initial transmission and before any new blocks. Because three blocks need to be retried, and because the initial retry is encoded with ½ rate 16 QAM data which each take up ½ of a slot, two different slots are needed. Therefore, two slots of the downlink stream 80, namely slots 2 and 3, are used to send, respectively, the data 110 and the data 130. Slot 2 is used to retry MDBKs 2 and 3 of data 110 and slot 3 is used to retry MDBK 4 and send new MDBKs 1 and 2 of data 130.

Because MDBKs 2 and 3 are being resent, the SI value contained in the MHBK 120 is 329 and the BI bits BI-2 and BI-3 are set. The LLC data 130 being sent in slot 3 is part of frame 4 of MF 5 of HF 8724. Therefore, the SI value calculated in accordance with Equation 1 for the new blocks is 1619, which is stored in memory along with the block numbers of the new blocks. The SI value contained in the MHBK 140 is also 329 because MDBK 4 is being retried. The only BI bit that is set in the MHBK 140 is BI-4 to indicate that MDBK 4 is being retried.

When the receiving unit receives the LLC data 110 in slot 2, the receiving unit determines from the BI bits that are set (BI-2 and BI-3) in the MHBK 120 that MDBKs 2 and 3 are retries. The receiving unit determines from the SI value of 329 that MDBKs 2 and 3 sent in slot 2 correspond to MDBKs 2 and 3 sent initially in slot 33, and subsequently matches up retried MDBKs 2 and 3 with initially transmitted MDBKs 2 and 3 to perform error correction in accordance with the HARQ protocol. The receiving unit determines from the BI bit that is set (BI-4) in the MHBK 140 that MDBK 4 is a retry and that new MDBKs 1 and 2 are newly transmitted blocks. The receiving unit determines from the SI value of 329 that MDBK 4 sent in slot 3 corresponds to MDBK 4 sent initially in slot 33, and subsequently matches up retried MDBK 4 with initially transmitted MDBK 4 to perform error correction in accordance with the HARQ protocol.

Figure 7:
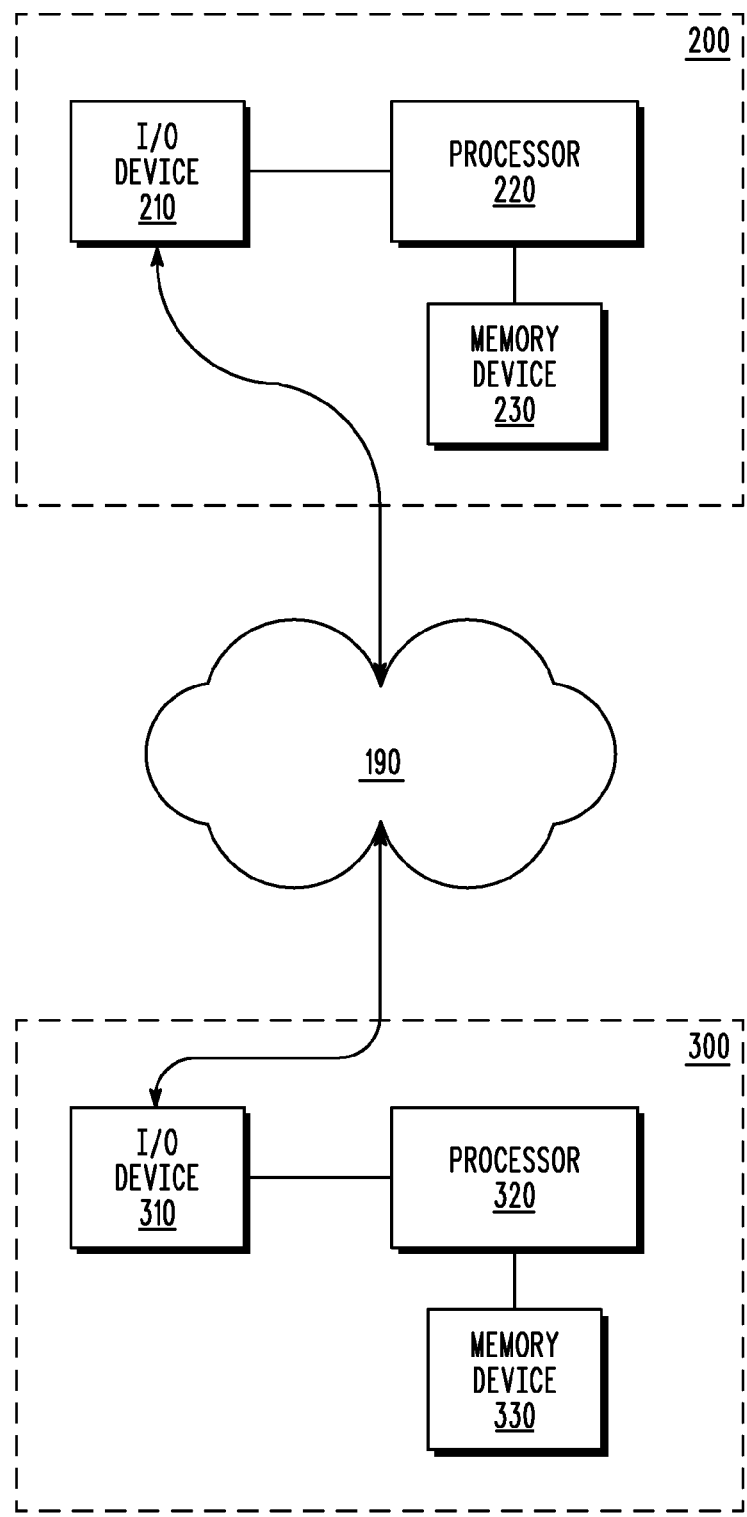
FIG. 7 illustrates the transmitting unit and the receiving unit of the invention, which communicate with each other via a wired or wireless link to perform the methods described above with reference to FIGS. 3 and 4, respectively.

FIG. 7 illustrates the transmitting unit 200 and the receiving unit 300 of the invention, which communicates with each other via a wired or wireless link 190 to perform the methods described above with reference to FIGS. 3 and 4, respectively. The transmitting unit 200 receives a data stream containing data to be sent to the receiving unit 300. The transmitting unit 200 may receive data from any location, such as, for example, from the LLC layer or from the MAC layer. An input/output (I/O) device 210 of the transmitting unit 200 receives the data stream and forwards data to a processor 220 of the transmitting unit 200. The processor 220 of the transmitting unit 200 performs the tasks described above with reference to FIG. 3, including, for example, computing the SI and storing the SI and associated block numbers in a memory device 230 of the transmitting unit 200, setting and clearing BI and SI bits in the MHBK, etc., ordering the MDBKs in the slot, and sending the MHBKs and the associated MDBKs to the receiving unit 300.

The receiving unit 300 receives data in a data stream from the transmitting unit 200. The receiving unit 300 may receive data from any location, such as, for example, from a LLC layer device or from a MAC layer device. An I/O device 310 of the receiving unit 300 receives the data stream and forwards data to a processor 320 of the receiving unit 300. The processor 320 of the receiving unit 300 performs the tasks described above with reference to FIG. 4, including, for example, determining whether any of the BI bits are set, using the SI value contained in the received MHBK to match up currently received retried blocks with previously received blocks, decoding data, performing error correction, sending ACK/NACK replies to the transmitting unit 200, etc. The receiving unit 300 also typically includes a memory device 330 for storing information. It should also be noted that the receiving unit 300 may also perform the functions of the transmitting unit 200 described above when the receiving unit 300 is required to function as a transmitting unit to send data to another network node (not shown). Likewise, the transmitting unit 200 may also perform the functions described above of the receiving unit 300 when the transmitting unit 200 is required to function as a receiving unit to receive and decode data, perform error correction, etc.

It can be seen from the description of FIGS. 1-7 above that the amount of signaling overhead that is required in accordance with the invention is much less than that which would be required if seventy-two bits were used in the MHBK to identify the six blocks that can potentially be sent in each slot, as would be the case using the twelve bits per block called for in current TIA-902 standard. A total of eighteen combined SI and BI bits are used in the MHBK described above with respect to the exemplary embodiments for the entire slot, which results in a significant reduction in signaling overhead and, consequently, more available bandwidth for data.

The processors 220 and 320 may be any type of computational devices including, for example, a microprocessor, a microcontroller, a programmable logic array, a programmable gate array, an application specific integrated circuit (ASIC), etc. The processors 220 and 320 may be implemented solely in hardware or in a combination of hardware and software or firmware. The memory devices 230 and 330 may be used to store any computer instructions that are executed by the processors 220 and 330, such as, for example, instructions needed to perform the algorithms described above with reference to FIGS. 3 and 4. The memory devices 230 and 330 may be any type of computer-readable mediums including, for example, random access memory (RAM), read only memory (ROM), flash memory, compact disks (CDs), digital video disks (DVDs), magnetic disks, magnetic tapes, etc. The invention also encompasses signals modulated on wired and wireless carriers in packets and in non-packet formats.

It should be noted that the invention has been described above with reference to some exemplary embodiments and that the invention is not limited to the embodiments described herein. Many modifications can be made to the embodiments described herein and all such modifications are within the scope of the invention. For example, the invention is not limited to using the SI and BI bit fields described above with reference to FIGS. 1, 2, 5 and 6. Rather, any SI and BI identifiers that are capable of being used in the manner described above to identify a particular block are suitable for use with the invention. Thus, the SI and BI each include one or more bits for accomplishing this objective. Likewise, the invention is not limited to the methods described above with reference to FIGS. 3 and 4. Some of the blocks may be combined, or changed in order, or eliminated altogether, provided the goals of the invention can still be achieved. Those skilled in the art understands the manner in which these and other modifications can be made, and that all such modifications are within the scope of the invention.

What is claimed is:

1. A method for reducing signaling overhead in a communication system using hybrid automatic repeat request (HARQ), the method comprising:
    identifying at least one block of data to be transmitted in a slot from a transmitting unit to a receiving unit;
    for each block of data to be transmitted for the first time, determining a slot identifier (SI) value based on a frame structure and a block identifier (BI) value based on a position of the block within the slot;
    storing the SI value, the BI value and bits from the block of data in a memory for each block of data to be transmitted for the first time;
    clearing an SI field and a BI field in a header if all the blocks of data to be transmitted in the slot will be transmitted for the first time; otherwise, setting at least one bit in the SI field and the BI field in the header such that the receiving unit is capable of determining which blocks of data are a retransmission and which information to retrieve from its memory to HARQ combine with the blocks of data that are a retransmission; and
    transmitting the slot comprising the header and the at least one block of data to the receiving unit.

2. The method of claim 1 further comprising:
    receiving an acknowledgement from the receiving unit for each block of data successfully decoded by the receiving unit; and
    clearing the SI value, the BI value and the bits from the block of data from memory for each block of data in which an acknowledgement was received.

3. The method of claim 1 wherein the step of identifying comprises identifying any blocks of data that need to be retransmitted to the receiving unit before identifying any blocks of data to be transmitted to the receiving unit for the first time.

4. The method of claim 1 wherein the blocks of data that need to be retransmitted reside within the slot before blocks of data to be transmitted for the first time.

5. The method of claim 1 wherein the blocks of data that need to be retransmitted reside in the same order within the slot in which they were initially transmitted.

6. The method of claim 1, wherein the frame structure includes a hyper-frame comprising a plurality of multi-frames, each multi-frame comprising a plurality of frames, and each frame comprising a plurality of slots.

7. The method of claim 1 wherein an initial transmission of a block of data dictates a block number associated with the block of data based on a position of the block of data in the slot.

8. The method of claim 7 wherein the step of setting at least one bit in the BI field comprises preserving an order of the initial transmission of the block of data by setting the at least one bit in the BI field that corresponds to the block of data being retransmitted based on the order of its initial transmission in the slot.

9. The method of claim 1 wherein the blocks of data to be transmitted for the first time are transmitted at a different modulation rate than blocks of data that need to be retransmitted.

10. The method of claim 1 wherein the blocks of data to be transmitted for the first time are transmitted at a same modulation rate as blocks of data that need to be retransmitted.

11. A method for reducing signaling overhead in a communication system using hybrid automatic repeat request (HARQ), the method comprising:
    receiving a slot from a transmitting unit comprising a header and at least one block of data;
    decoding the header to determine whether any of the blocks of data received in the slot are retransmissions;
    for each block of data determined to be received for the first time, determining a slot identifier (SI) value based on a frame structure, determining a block identifier (BI) value based on a position of the block within the slot, and storing the SI value, the BI value and bits from the block of data in a memory; and
    for each block of data determined to be a retransmission, determining the SI value and the BI value for the block of data that is a retransmission from the header, retrieving information from memory corresponding to the SI value and the BI value determined for the block of data that is a retransmission, and combining the block of data that is a retransmission with the retrieved information using HARQ to create a combined block of data.

12. The method of claim 11 wherein if the block of data is being received for the first time, decoding the block of data received in the slot; otherwise decoding the combined block of data.

13. The method of claim 11 wherein the step of decoding the header to determine whether any of the blocks of data transmitted in the slot are retransmissions further comprises determining a value in an SI field and a BI field within the header to determine whether any of the blocks of data transmitted in the slot are retransmissions.

14. The method of claim 11 further comprising sending an acknowledgement to the transmitting unit for a block of data upon successful decoding of the block of data.

15. The method of claim 14 further comprising clearing stored information from memory relating to the block of data that was successfully decoded.

16. The method of claim 11 further comprising sending a negative acknowledgement (NACK) to the transmitting unit for a block of data if the block of data was not decoded successfully.

17. The method of claim 16 further comprising storing additional information in memory for the block of data that was not decoded successfully.

18. The method of claim 17 wherein the additional information is from the combined block of data.

19. The method of claim 11 wherein the blocks of data that are determined to be received for the first time are decoded at a different modulation rate than blocks of data that are determined to be a retransmission.

20. The method of claim 11 wherein the blocks of data that are determined to be received for the first time are decoded at a same modulation rate as blocks of data that are determined to be a retransmission.

* * * * *